Nov. 30, 1937. W. W. STEVENSON 2,100,495
FLUID METER
Filed May 18, 1935 5 Sheets-Sheet 1
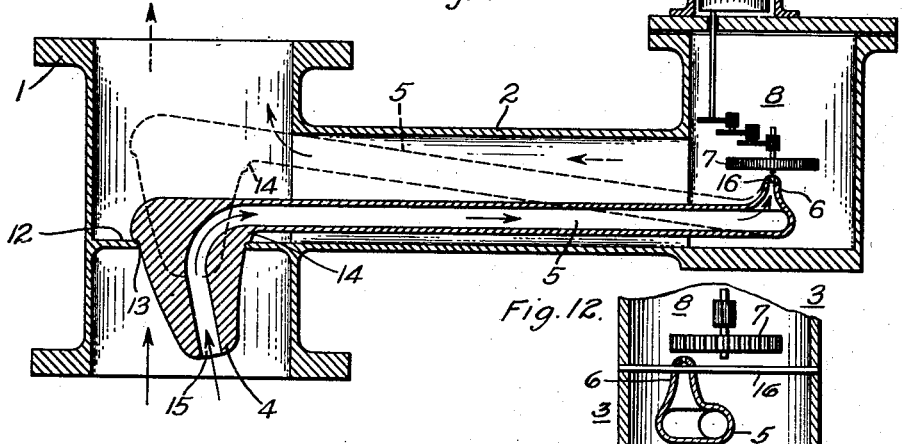
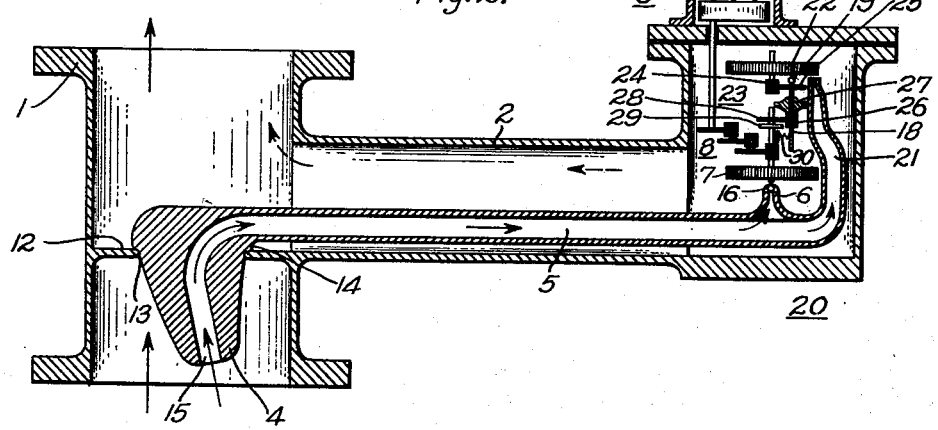
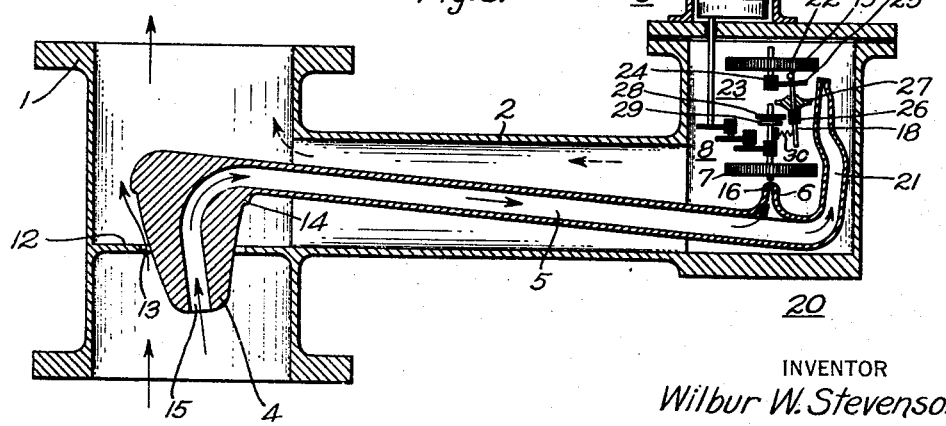
INVENTOR
Wilbur W. Stevenson.
BY
William R. Coley
ATTORNEY

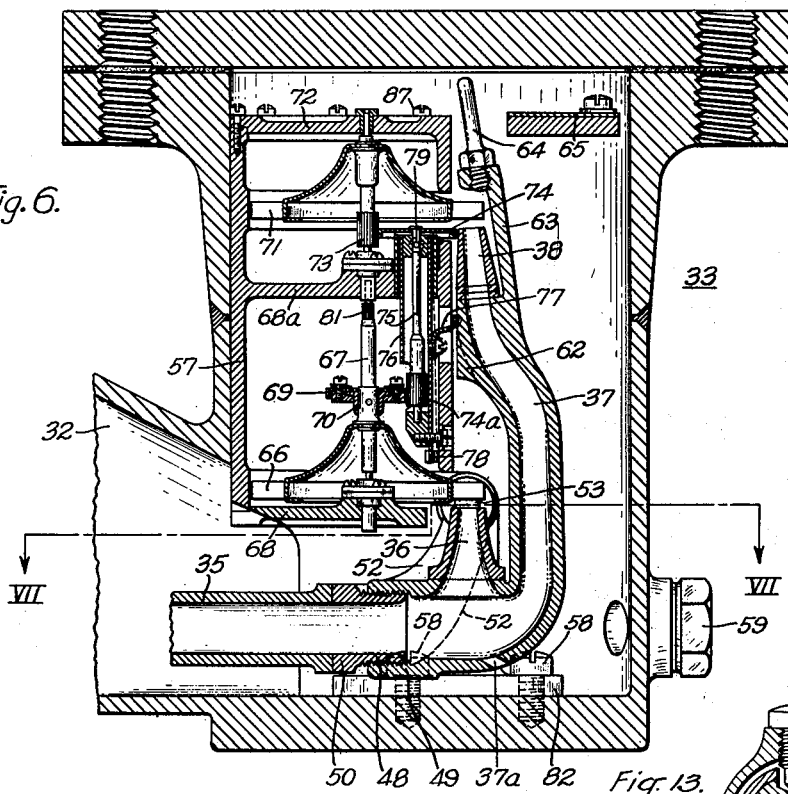
Fig. 6.
Fig. 13.
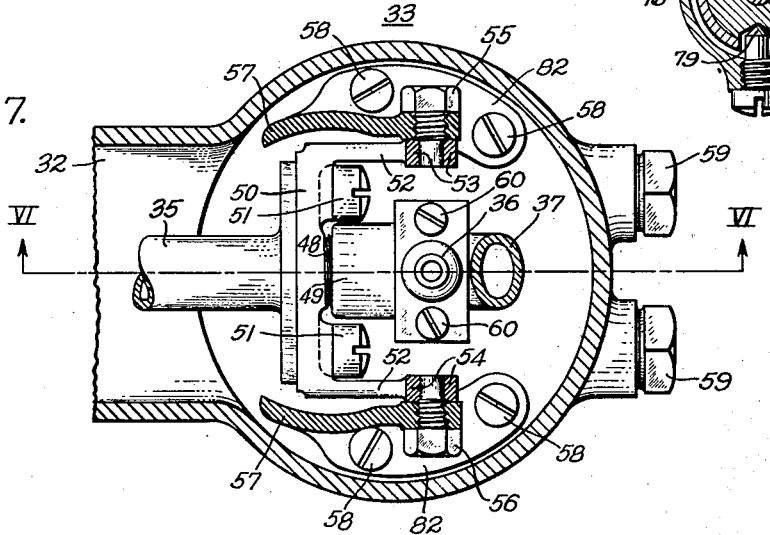
Fig. 7.

Nov. 30, 1937.  W. W. STEVENSON  2,100,495
FLUID METER
Filed May 18, 1935   5 Sheets-Sheet 4

WITNESS
Nm. C. Groome

INVENTOR
Wilbur W. Stevenson.
BY
William R. Coley
ATTORNEY

Nov. 30, 1937.  W. W. STEVENSON  2,100,495
FLUID METER
Filed May 18, 1935   5 Sheets-Sheet 5

WITNESS

INVENTOR
Wilbur W. Stevenson.
BY
William R. Coley
ATTORNEY

Patented Nov. 30, 1937

2,100,495

UNITED STATES PATENT OFFICE 2,100,495

FLUID METER

Wilbur W. Stevenson, Pittsburgh, Pa.

Application May 18, 1935, Serial No. 22,155

24 Claims. (Cl. 73—197)

My invention relates to fluid meters and particularly to meters for measuring the flow of steam, water or gas.

One object of my invention is to provide a meter having a wider range of operating accuracy than other meters of the class regularly used in the measurement of fluid flow.

Another object of my invention is to provide a rugged and stable meter that is accurate at all speeds and yet is relatively simple in construction and operation.

A further object of my invention is to provide a meter of the class indicated in which one wheel or rotor is provided for low speeds and a second wheel or rotor for two higher speeds, the two rotors and the three speeds being so coordinated that a shift from one to the other occurs without a break in the registering action.

A more specific object of my invention is to provide a meter having a closure or plug of special contour that is raised different amounts by predetermined fluid flow to vary the speed of a turbine wheel as the flow of fluid increases, this plug acting as a calibrating element, either alone or in combination with a cam plate structure, during a certain, preferably the normal, speed range.

Other objects of my invention will become evident from the following detailed description taken in conjunction with the accompanying drawings, wherein three diagrams, Figs. 1, 2 and 3, are first presented to illustrate the meter in its simplest but not preferred form;

Figure 1 is a view in longitudinal section of a fluid meter having certain characteristic features of my present invention;

Figs. 2 and 3 are similar views of a modified fluid meter with parts shown in the closed and the open position, respectively, for providing an accurate wide range meter in accordance with my present invention;

Figs. 6 and 7 are views in section, respectively taken along the lines VI—VI of Fig. 7 and VII—VII of Fig. 6;

Fig. 12 is a partial view taken at right angles to the view of Fig. 1; and Fig. 13 is a horizontal sectional view through the pivotal mounting 79 of Fig. 6.

Figure 5:
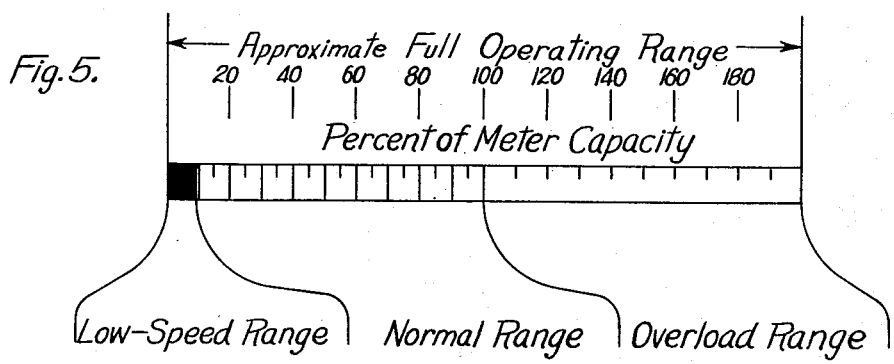
Fig. 5 is a diagram or chart serving to indicate, in general, the operation and function of the structure shown in Fig. 4.

Referring first to Fig. 5 of the drawings, this diagram illustrates the three ranges into which the approximate full operating range of a fluid meter constructed in accordance with my invention may be divided, namely, a low speed range covering speeds from zero to 8%; a normal range covering speeds varying from 8% to 100%; and an overload range covering speeds varying from 100% to 200%. As subsequently noted in detail, I provide a meter having two turbine wheels or rotors, one of them being utilized during the above-identified low speed range and the other during the two higher ranges, thereby providing accuracy of registering or integrating under all conditions.

In the low-speed range, the low-speed rotor operates the register by means of a fixed nozzle at a variable jet velocity; in the normal range, the main or high-speed rotor is operated by means of a variable pitch nozzle at approximately constant jet velocity; and in the overload range, the main rotor is operated by means of a fixed nozzle at a variable jet velocity.

Referring now to the diagram designated as Fig. 1, the structure here shown comprises a casing 1 adapted to form a section of a main fluid flow pipe or conduit having a lateral pipe extension 2 communicating with the meter rotary mechanism and casing 3. A specially shaped plug 4 is adapted to serve as a weight to build up a differential pressure in accordance with the volume of fluid flow and is integrally or otherwise connected with a small pipe lever 5 extending through the large lateral pipe 2 and terminating in an orifice or nozzle 6, the plug assembly being capable of rotation around a point 16 located near the nozzle 6. The nozzle 6 operates on, or causes fluid to impinge on, the blades of a turbine wheel or preferably radial straight blade rotor 7 to one side of the center thereof, as shown in Fig. 12, which rotor, through the usual reducing gear assembly 8, drives an integrating mechanism or register 9, for example, of the meter.

A partition or web 12 located intermediate the ends of the pipe section 1 is provided with a central orifice 13, through which the plug 4 projects in its normal position, shoulders 14 thereof resting on the edges of the orifice 13 which is completely filled by the plug. This plug is roughly of inverted cone shape and operates as a valve. The special shape thereof is such that an annular orifice within the main orifice 13 of varying cross section is formed as the plug is raised or lowered in accordance with the differential relations between the weight of the plug and its associated parts and the pressure of the fluid acting against the plug and tending to flow past it in the opening direction thereof, as indicated by the arrows.

Thus, whenever the plug 4 is partially or wholly raised from its seat within the orifice 13, fluid may flow around the edges thereof through the pipe 1, but when the plug occupies the closed position shown in Fig. 1, no fluid flows directly through the pipe 1, but a small volume of fluid is permitted to flow through a curved passage 15 located centrally of the plug and communicating with the pipe lever 5 leading to the nozzle 6, as indicated by the solid arrows, after which such fluid flows through the pipe extension 2 and into pipe 1, as indicated by the dotted arrows.

In this way, during the period when the plug occupies its closed position, which is the low fluid flow period corresponding to the zero to 8% range of the diagram of Fig. 5, fluid flows through the passage 15, pipe lever 5 and nozzle 6 to the wheel or rotor 7, and thence out, as traced above. During this low speed range nozzle 6 is fixed at such an angle relative to the blades of rotor 7, that the rotor would be revolved at a speed directly proportional to the rate of fluid flow, provided all moving parts of the meter were frictionless. In practice the rotor will either not revolve at all, or at least not in true proportion to the fluid flow because of the very small angular displacement of nozzle 6 and the friction of moving parts. Provisions for these limitations will be discussed in detail later on. During higher operating speeds corresponding to the greater quantities of fluid flow in the normal operating range, the plug 4 is moved to a more or less elevated position, the dotted lines indicating the uppermost position, such rotation occurring around the pivotal point 16 located near the nozzle 6, thus varying the angle of impingement upon the blades of the rotor 7 of the fluid issuing from the nozzle 6. In this way, a variable angle of impingement is provided in accordance with the position of the plug 4, which, in turn, is dependent upon the volume of fluid flow. This range of variable orifice and variable nozzle position is the 8% to 100% capacity range illustrated in Figure 5.

After the plug has reached its uppermost or dotted line position, the nozzle 6 obviously becomes stationary, and as the rate of flow continues to increase, rotor 7 is driven by this fixed nozzle at a rate of speed proportional to the rate of fluid flow through the entire meter, following the basic principle of the flow of fluids through divided or parallel circuits in combination with the operating principle of a simple anemometer, of which the main rotor is a modification. This fixed nozzle operating range corresponds to the overload or 100% to 200% range illustrated in Figure 5.

This simple diagram, Figure 1, which involves only one rotor therefore illustrates my complete meter, so far as its three fundamental operating principles are concerned; namely, 1.—Fixed orifice low speed range.
2.—Variable orifice normal range.
3.—Fixed orifice overload range.

However, the use of a single nozzle such as 6, because of its very small fixed angular displacement during the zero to 8% operating range, does not provide a meter that is accurate during this low speed range, and to overcome this defect, I have provided an assembly such as shown in Figs. 2 and 3, which, in addition to the parts shown in Fig. 1 and already described, with the exception that the meter rotary mechanism and casing 20 is substituted for the similar apparatus 3 of Fig. 1, includes an additional nozzle tube 21 forming an extension of the pipe lever 5 and curving upwardly around the turbine wheel or rotor 7, which may be termed the main rotor, to terminate in a nozzle located just below the second preferably radial straight blade rotor or turbine wheel 22, which will hereafter be termed the low speed rotor. As subsequently described in more detail, the low speed rotor 22 is utilized over the zero to 8% range, indicated in black in the diagram of Fig. 5, corresponding to the period when the plug 4 occupies its lowermost or closed position illustrated in Fig. 2, whereas the main rotor 7 is utilized in the two speed ranges above the 8% value.

The low speed rotor 22 may be intermittently connected with the reducing gear assembly 8, which is thus common to both rotors, by means of a back gear assembly 23 comprising a pinion 24 mounted on the spindle of the low speed rotor 22 to constantly mesh with a gear 25 mounted on a spindle 18 which is pivoted at its topmost point as indicated at 19. Intermediate the ends of the spindle 18 a second pinion 26 is secured for intermittently meshing with a gear wheel 28 on the same spindle or shaft as the main rotor 7, a brake clutch mechanism 29 being associated with the gear wheel 28 to permit any necessary slippage during the time that the two rotors 22 and 7 are both temporarily connected to the reducing gear assembly 8, which occurs during transition from the low speed arrangement to the high speed arrangement, and vice versa, of my present meter, as subsequently described in more detail.

Normally, the spindle 18 of the back gear assembly 23, while rotating, is inoperative from the standpoint of meter registration, by reason of a spring 30 biasing the pinion 26 out of engagement with the gear wheel 28, this action occurring above the 8% speed value of the diagram of Fig. 5, or, in other words, above the low speed range. However, during such low speed range from zero to 8% speed, the low speed nozzle tube 21 occupies such a position that it, along with the movable plug 4 and pipe lever 5, having been rotated counter-clockwise around the pivotal point 16, bears against a projection 27 on the spindle 18, thus forcing the pinion 26 into engagement with the gear wheel 28, as shown in Fig. 2. The mechanical details of the back gear assembly as shown diagrammatically in Figs. 2 and 3 are identical with those shown in Figs. 4 and 6 of the preferred form drawings.

During low speed operation, therefore, corresponding to the position of the parts in Fig. 2, the low speed rotor 22 is driven through the nozzle tube 21, and the back gear assembly 23 is fully in mesh to drive the reducing gear assembly 8 and operate the integrating mechanism 9. Under these conditions, the main nozzle 6 occupies such a position relative to the blades of the main rotor 7 that the fluid issuing from nozzle 6 has very little effect thereon, the low speed rotor 22 thus predominating. As noted above, under such conditions the movable plug 4 occupies its closed position, as shown in Fig. 2.

However, under higher speed operation, when the movable plug 4 occupies an elevated position, such as shown in Fig. 3, the main nozzle 6 has been correspondingly tilted to change the angle of impingement of the fluid issuing therefrom upon the blades of the main turbine rotor 7, whereas the nozzle tube 21 has swung outwardly to such a position that any fluid issuing therefrom has no effect on the low speed rotor 22, and thus the main rotor 7 predominates during such high speed operation, that is, above the 8% value. Under these conditions, it will also be noted that the spring 30 has biased the spindle 18 to a position where pinion 26 is out of mesh with gear wheel 28, so that the low speed rotor and the back gear assembly 23 are inoperative, as noted above. Such meshing and unmeshing of the back gear assembly 23, or more specifically of pinion 26 and gear wheel 28, occurs in approximately "zero" time and during approximately "zero" change of flow, just at the instant the shoulder 14 of plug 4 seats on or raises from the edge of orifice 13.

By the provision of this double rotor assembly, therefore, one rotor being utilized for a predetermined low speed range and the other for a predetermined normal speed and overload range, an accurate registration of fluid flow is automatically provided over the entire range of operation of the meter.

Referring to the preferred form of my invention shown in the remaining figures, which is specially adapted for use with large pipes, the structure shown comprises a main pipe or conduit section 31 having a lateral extension 32 communicating with a meter casing and assembly 33. A movable plug 34 of different shape from the plug 4 but operating in a similar manner is provided within the pipe 31 and is provided with a small lateral pipe extension or lever 35 extending through the large lateral pipe extension 32 and communicating with both a main nozzle 36 and through what will hereafter be termed an angling tube 37, corresponding to the tube 21 of Fig. 2, which terminates in a nozzle 38. Intermediate of the main pipe or conduit section 31 is a partition or web 40 having an orifice 41 through which the movable plug 34 projects, having shoulders 42 seating upon the edges of the orifice 41 in the position shown in Fig. 4 and completely filling such orifice in this lowermost position. A central curved passage 43 is provided through the plug 34 for the passage of fluid into the laterally extending pipe lever 35 and thence to the main or lower nozzle 36 for operating the main or high speed preferably radial straight blade rotor 66 and through the angling tube 37, which is bent upwardly around the main rotor 66, to the upper or low speed nozzle 38 which operates on the low speed preferably radial straight blade rotor 71.

Figure 4:
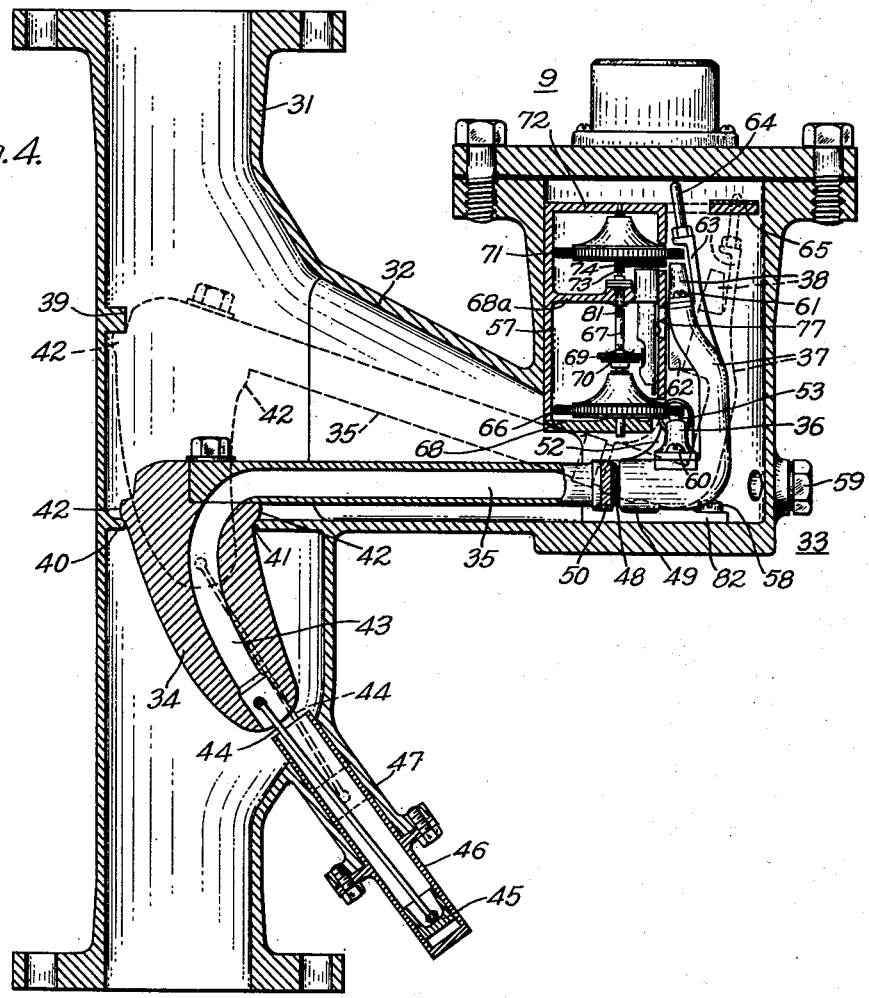
Fig. 4 is a view in longitudinal section of the preferred form of meter constructed in accordance with my present invention.

The movable plug 34 and its associated parts pivot around a point indicated at 53 in Fig. 4 and an alined pivotal point 54, as shown in Fig. 7, that is, these two pivotal points corresponding to the single pivotal point 16 shown in Fig. 2. The uppermost position of the movable plug 34 and its associated pipe lever 35 is indicated in dotted lines, a shoulder on the plug in such uppermost position coming into contact with a restraining boss or internal projection 39 within the main pipe 31.

In order to eliminate chattering of the movable plug 34 during its up and down movements, a dash pot structure is preferably secured thereto comprising, for example, a long link 44 having one end pivoted near the mouth of the internal passage 43 and the other end pivoted within a small piston 45 operating within a cylinder 46, which may be bolted or otherwise secured to a cylindrical sleeve 47 integrally or otherwise secured to the pipe 31 and extending at the proper angle to house the illustrated dash pot structure.

In the structure shown in Figs. 2 and 3, the low speed nozzle tube 21 was capable of a rotative movement in the plane of the paper, dependent upon the up and down movements of the movable plug 4. In the preferred structure shown in Fig. 4, et seq., this movement of the low speed or angling tube 37 may occur, but it is unimportant in itself from the standpoint of operation of the main turbine rotor, the significant movement of this angling tube to vary the angle of impingement of the fluid issuing from the main nozzle 36 occurring by reason of a shifting of the angling tube at an angle to the plane of the drawings, by reason of the following described construction.

In lieu of the pipe lever 35 extending rigidly into the angling tube 37, the pipe 35 terminates in a flange which is secured to a yoke 50, as best shown in Fig. 7, by means of short screws 51. This yoke is provided with two arms 52 extending substantially parallel to the pipe lever 35 and terminating in collars 53 and 54 having a rotating fit with the ends of special bolts 55 and 56, the intermediate portions of which are threaded into the casing 57 for the meter parts proper, which casing is located within the main casing 33. As previously noted, in this manner the plug 34 and pipe lever 35 may rotate upwardly and downwardly around the alined pivotal points or axes 53 and 54.

A central projecting portion or nipple 48 of the yoke 50 is threaded, as shown in Figs. 4 and 7, for example, to fit into a similarly threaded socket or sleeve 49 which may thus rotate around the threaded portion 48 of the yoke, or, in other words, the angling tube 37 may rotate at an angle to the plane of the paper and with respect to the pipe lever 35.

Figure 9:
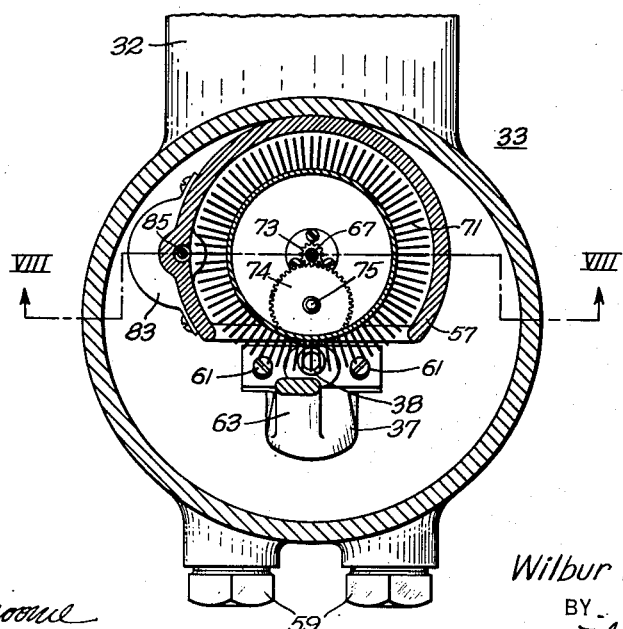

The inner meter casing 57 is shown as provided with a pair of oppositely disposed bottom portions or plates 82 which may be secured by screws 58 to the bottom of the main or outer casing 33. It is also provided with intermediate plates 68 and 68a and a top plate 72 which are utilized for providing bearing mountings for the main and low speed rotors, as subsequently described. This inner casing 57 is circular in transverse section, as best shown in Fig. 9, and is open at one side to provide the necessary clearance for certain operating members on that side, as clearly shown in Fig. 9.

Near the bottom of the outer casing 33, a pair of bolts 59 are provided to fill openings through which access may be had to turn screws 51 which secure the yoke 50 to the pipe lever 35, thus permitting ready disassembly of these parts when desired. The main nozzle 36 is secured by screws 60 to the horizontal or lowermost portion of the angling tube 37, as shown in Fig. 7. Similarly, the low speed nozzle 38 is secured by screws 61 to the upper end of the angling tube 37. A projection 62 extends inwardly from an intermediate portion of the angling tube 37 toward the rotors for the double purpose of harmlessly diverting the flow of fluid after it has passed through the blades of the main rotor 66 and providing a member for urging the illustrated back gear structure, including pinion 74a, (Fig. 6) into mesh with the gear wheel 69 during effective action of the low speed rotor 71, as subsequently described in detail.

Figure 10:
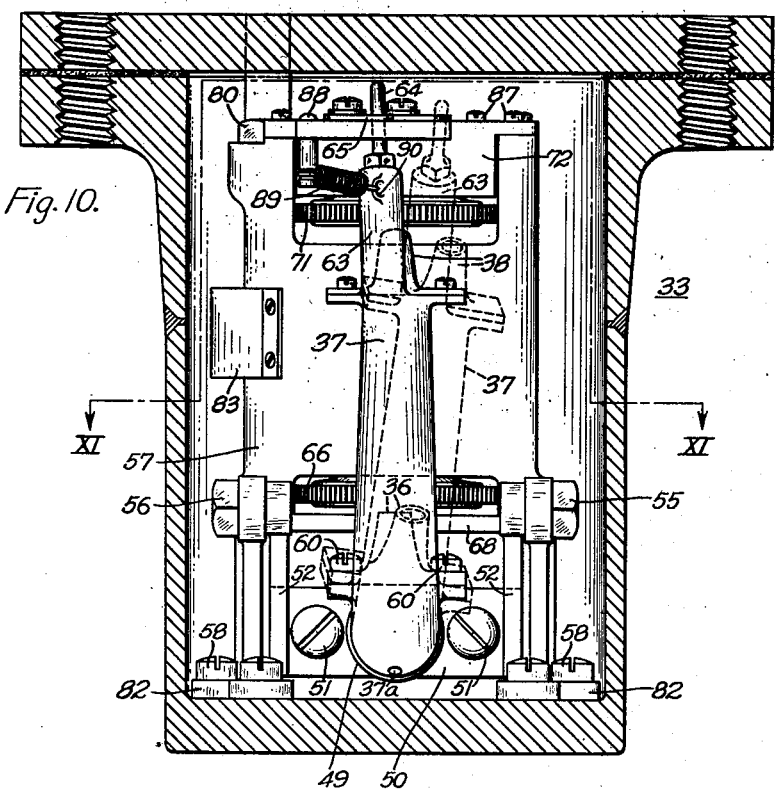
Figs. 10 and 11 are sectional views, respectively taken along the lines X—X of Fig. 11 and XI—XI of Fig. 10, Figs. 6 to 11, inclusive, being views of the preferred form of my invention.
Figure 11:
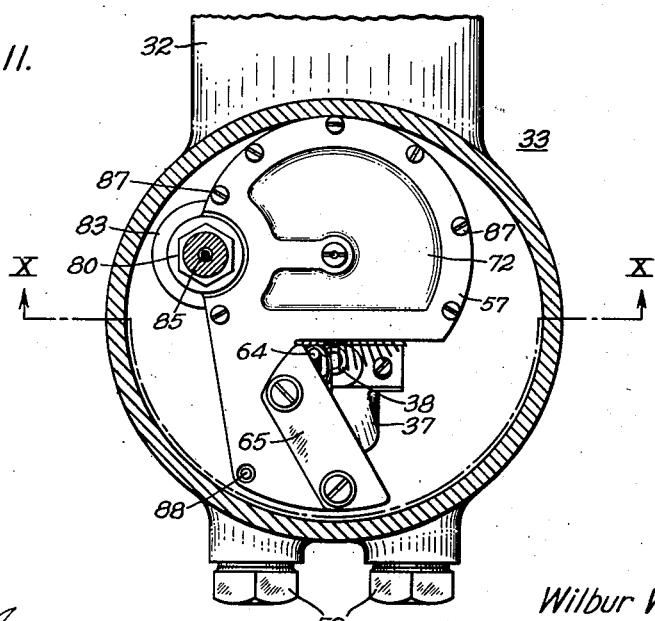

Extending on the outer side of and above the low speed nozzle 38 is an arm 63 preferably integral with the angling tube 37, terminating in a cam contactor or pin 64 suitably threaded into the end of the arm 63 and operating on a cam plate 65 set at an angle to the cross-sectional plane of Fig. 6, this plate 65 being shown in plan in Fig. 11. This cam contactor or pin 64 is held in close contact or engagement with the cam plate 65 by means of a spring 89, shown in Fig. 10 as operating between an eye 90 near the upper end of arm 63 on the angling tube 37 and a stationary pin 88 secured to the upper plate 72 of the inner casing 57.

As a result of this construction and mounting of the angling tube, it will be observed that shifting of the contactor or pin 64 along the cam plate 65 occurs from the position illustrated in solid lines in Figs. 4 and 10, corresponding to the low speed position, wherein nozzle 38 operates on low speed rotor 71, to the high speed position shown in dotted lines in Figs. 4 and 10, wherein the nozzle 38 is out of operative relation with the low speed rotor 71 and the main nozzle 36, as best illustrated in Fig. 10, has been moved into such a position that the angle of impingement of fluid issuing therefrom is varied with such transverse movement of the angling tube to maintain the proper speed of the high speed rotor 66.

To describe the preferred rotor construction, such as shown in Fig. 6 in more detail, the main or high speed rotor 66 is mounted in operative relation with the main nozzle 36 upon a spindle or axle 67, the lower portion of which has a sleeve and pivot bearing with the intermediate plate or web 68 of inner casing 57 and the upper portion of which has a pin bearing with the second intermediate plate or web 68a. Above the main rotor 66 is mounted the gear wheel 69 intermittently meshing with pinion 74a, constituting a part of the back gear assembly utilized in connection with the low speed rotor 71, with which gear wheel 69 is associated a suitable brake-clutch mechanism 70 to permit any necessary slipping of parts, as previously noted, during the transition period from the effective action of the low speed rotor to that of the high speed rotor, and vice versa.

In the upper portion of the inner casing 57, the low speed rotor 71 is mounted on a suitable spindle having a sleeve and pivot bearing in the intermediate plate 68a and a pin bearing in the upper plate 72. A pinion 73 is disposed just below the low speed rotor 71 to mesh with a gear wheel 74 constituting a part of the above-noted back gear assembly, gear wheel 74 being mounted on a spindle 75 which has a two-pin pivotal mounting 79 just below the gear wheel 74 in a block or disc 76a located within the upper portion of a short tube 76 through which the spindle 75 extends. The tube 76, spindle 75, gear wheel 74 and pinion 74a may thus pivot around the mounting 79, the two pins of which extend into the said block or disc through the walls of tube 76. See Fig. 13. On the outer side of this tube 76 a curved projection or arm 77 extends for the purpose of engaging the extension or projection 62 on the inner side of the angling tube 37, as previously mentioned. On the lower end of the spindle 75, pinion 74a is mounted for the purpose of intermittently meshing with gear wheel 69 on the spindle 67 of the main rotor 66, as previously noted.

Figure 8:
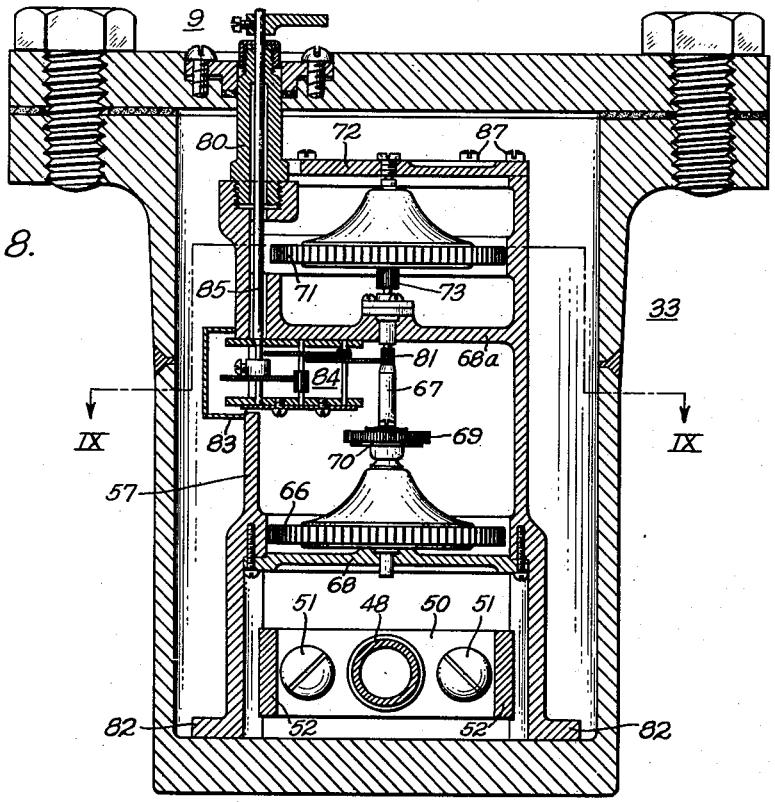
Figs. 8 and 9 are sectional views, respectively taken along the lines VIII—VIII of Fig. 9 and IX—IX of Fig. 8.

In the position of parts shown in Fig. 6, wherein the angling tube 37 is in its low speed position corresponding to effective cooperation between low speed nozzle 38 and low speed rotor 71, the inner projection 62 on angling tube 37 engages arm 77 on small tube 76, thus forcing pinion 74a into engagement with gear wheel 69 of the illustrated back gear assembly, this pinion 74a rotating around the pivotal point 79 near the upper end of spindle 75, as previously explained. Under such conditions, the fluid issuing from the low speed nozzle 38 drives low speed rotor 71, which operates through pinion 73, gear wheel 74, pinion 74a and gear wheel 69 to drive the reducing gear assembly 84, shown in Fig. 8, through pinion 81 on the spindle 67 of the main rotor 66. This reducing gear assembly 84, which is preferably provided with a sheet metal cover 83, as shown in Figs. 8 and 9, drives a shaft 85 through a pressure tight gland 86, thus operating the integrating or registering mechanism 9.

A drain hole 37a (shown in Fig. 6) at the bottom of the bend in angling tube 37 is provided for the purpose of draining extraneous fluids from the angling tube 37 before reaching the nozzles 36 and 38. This opening may also be used to bypass a definite quantity of fluid for the purpose of extending the measuring range of the low speed rotor 71.

However, under high speed conditions corresponding to the dotted line position of angling tube 37 shown in Fig. 4, the projection 62 on the angling tube is removed from contact with the arm 77 on small tube 76, whereupon flat spring 78 biases the tube 76 (swinging around pivot pins 79) to the illustrated dotted line position in Fig. 6, thus effecting a disengagement of pinion 74a and gear wheel 69 of the illustrated back gear assembly without necessarily effecting disengagement of pinion 73 and gear wheel 74. In this way, the driving action of the low speed rotor 71 with respect to the reducing gear assembly 84 is eliminated, and the high speed rotor 66 operated on by nozzle 36 in the desired angular impinging position shown in Fig. 10, for example, is thereafter alone utilized for driving the reducing gear assembly 84, corresponding to the operation of the form of my invention illustrated in Figs. 2 and 3.

The upper plate 72 of inner casing 57 may be secured in any suitable way to the circular portion of the casing 57 as by means of small screws 87, as shown in Figs. 10 and 11.

The operation of the preferred form of my invention shown in Fig. 4, et seq. may be summarized as follows: Under low speed conditions, corresponding to the range below 8% speed, in the diagram of Fig. 5, movable plug 34 occupies its lower or closed position, as shown in solid lines in Fig. 4, and fluid is admitted through the plug and pipe lever 35 into both main nozzle 36 and low speed nozzle 38. However, the angle between main nozzle 36 and the blades of main rotor 66 is such that main rotor 66 is essentially ineffective. On the other hand, fluid issuing from low speed nozzle 38, which is set at a fixed angle relative to the low speed rotor blades, drives low speed rotor 71, which, through the previously described back gear assembly, including pinion 74a, drives the reducing gear assembly 84.

Just after passing the 8-degree point, the movable plug 34 is raised from the solid line position shown in Fig. 4, thus starting movement of the angling tube 37 through the action of the contactor pin 64 and cam plate 65 towards the dotted line position shown in Fig. 10, whereupon the following actions occur: The auxiliary nozzle 38 moves out of effective range with respect to the low speed nozzle 71 and at the same time, as previously described, spring 78 biases pinion 74a out of engagement with gear wheel 69. Also at this time, the angle of impingement of main nozzle 36 becomes such that it starts to effectively drive main rotor 66 and continues to do so as the angle of impingement increases up to the maximum angle indicated by dotted lines in Fig. 10. After this maximum angle is reached, and the rate of flow increases still further, the main rotor continues to increase in speed in proportion to the rate of fluid flow as previously described.

During the change from low to normal range speed, there is little, if any, necessity of utilizing the brake clutch mechanism 70 shown in Figs. 4 and 6, as the pinion 74a is disengaged from gear wheel 69 at the 8-degree point. However, when the speed is decreasing and the transition is to be made from the normal range speed to the low speed drive, the low speed rotor 71 is again driven as the 8-degree point is reached, and whatever slippage is necessary to effect final synchronous operation between the low speed rotor 71 and the high speed rotor 66 is taken up by the brake clutch mechanism 70, after which the position of main nozzle 36 again renders it substantially ineffective and, as previously noted, the low speed nozzle 38 and low speed rotor 71 take over the operation of the meter.

It is particularly desired to point out that the above-described structure provides a substantially accurate meter registration during the low speed range below 8%, by reason of the predominating action of the low speed rotor structure, and also accurate registration during the upper periods, by reason of the predominating action of the high speed rotor structure. In the low speed and overload ranges, the calibration of the meter depends on the velocity of the variable jets from the one or the other nozzle; whereas, in the normal speed range (8% to 100%), such calibration depends on the shape of the movable plug 34 alone or in combination with the shape of the contacting surface of the cam plate 65. If the cam plate is made with a straight line contacting surface, then the calibration of the meter may be provided entirely by the surface contour of the movable plug. The other extreme would be to provide a straight line surface plug in the form of a truncated cone and provide all the calibration by means of the cam. Obviously, any intermediate combination of plug contour and cam could also be used. From this it will be noted that the structure shown in Figs. 2 and 3 and that shown in the subsequent figures are fundamentally equivalent, the main difference being the provision of a swivel joint on the angling tube 37 and the angular location of the tube that is produced by the cam plate 65. By the provision of the angling tube and cam plate in the preferred form, the total angular displacement of the fluid jet causing rotation of the main rotor 66 may be only 4 to 6 degrees for effective accurate action, whereas, under such conditions, the angular displacement of the movable plug 34 may be nearly 30 degrees. Consequently, the structure shown in the preferred form (Fig. 4, et seq.) makes it possible to provide a much smaller meter for large pipe sizes than would be possible by utilizing the simpler form shown in Figs. 2 and 3, which is better adapted for small pipe sizes.

While I have shown my invention in two different forms, I desire it to be understood that further modifications thereof may be made without departing from the spirit and scope of my invention. I desire, therefore, that only such limitations shall be imposed thereon as are indicated in the appended claims.

I claim as my invention:

1. A fluid meter having a fluid-passing opening, a plug therefor of such contour as to gradually uncover said opening upon predetermined increased fluid flow, a rotatable turbine wheel on which fluid upstream of said opening is made to impinge, and means responsive to such uncovering for varying the angle of such impingement.

2. A fluid meter having a fluid-passing opening, a closure therefor to which predetermined fluid flow imparts movement, a registering mechanism, a plurality of rotatable members for driving said mechanism on which fluid upstream of said opening is made to impinge, and means responsive to said movement for varying the characteristics of while continuing unabated such impingement to cause the one or the other rotatable member to predominate at predetermined flows by varying its speed.

3. A fluid meter having a fluid-passing opening, a closure therefor of such contour as to be gradually moved to fully open position by predetermined increase in fluid flow, a registering mechanism, a plurality of rotatable turbine wheels for driving said mechanism on which fluid upstream of said opening is made to impinge, and means responsive to such movement of said closure for varying the characteristics of while continuing unabated such impingement to cause the one or the other turbine wheel to predominate at predetermined flows by varying its speed.

4. A fluid meter having a fluid-passing opening, a plug therefor of such contour as to gradually uncover said opening upon predetermined increased fluid flow, a registering mechanism, a plurality of rotatable turbine wheels for driving said mechanism on which fluid upstream of said opening is made to impinge, and means responsive to such uncovering for varying the effective angle of impingement on one of said turbine wheels to thereby cause it to predominate over the other.

5. A fluid meter having a fluid-passing opening, a closure therefor to which predetermined fluid flow imparts movement, a plurality of rotatable members on which fluid upstream of said opening is made to impinge, and means responsive to said movement for varying the characteristics of while continuing unabated such impingement to cause first one and then the other rotatable member to be driven at a speed corresponding to the degree of fluid flow, a registering mechanism normally connected to only one of said rotatable members, and means responsive to said movement for effectively connecting the other rotatable member to said registering mechanism under predetermined flow conditions.

6. A fluid meter having a fluid-passing opening, a closure therefor of such contour as to be gradually moved to fully open position by predetermined increase in fluid flow, a plurality of rotatable turbine wheels on which fluid upstream of said opening is made to impinge, and means responsive to such movement of said closure for varying the characteristics of while continuing unabated such impingement to cause first one and then the other turbine wheel to be driven at a speed corresponding to the degree of fluid flow, a registering mechanism normally connected to only one of said turbine wheels, and means responsive to said movement for effectively connecting the other turbine wheel to said registering mechanism at a predetermined degree of flow.

7. A fluid meter having a fluid-passing opening, a closure therefor to which predetermined fluid flow imparts movement, a rotatable member, and a nozzle connected to and receiving fluid through said closure and delivering it to said rotatable member, said nozzle being pivoted to be responsive to said movement for varying the angle of fluid delivery of said nozzle.

8. A fluid meter having a fluid-passing opening, a plug therefor of such contour as to be gradually moved to fully open position by predetermined increase in fluid flow, a rotatable turbine wheel, and a nozzle connected to and receiving fluid through said plug and delivering it to said turbine wheel, said nozzle being pivoted to be responsive to said movement for varying the angle of fluid delivery of said nozzle.

9. A fluid meter having a fluid-passing opening, a closure therefor to which predetermined fluid flow imparts movement, a plurality of rotatable members, a registering mechanism adapted to be driven thereby and a plurality of nozzles connected to and receiving fluid through said closure and delivering it to the respective rotatable members, said nozzles being pivoted to be responsive to said movement for varying the angle of fluid delivery of one of them to one of said rotatable members thereby to cause it to predominate over the other in driving said registering mechanism.

10. A fluid meter having a fluid-passing opening, a plug therefor of such contour as to be gradually moved to fully open position by predetermined increase in fluid flow, a plurality of rotatable turbine wheels, a registering mechanism adapted to be driven thereby, and a plurality of nozzles connected to and receiving fluid through said plug and delivering it to the respective turbine wheels, said nozzles being pivoted to be responsive to said movement for varying the angle of fluid delivery of one of them to one of said turbine wheels thereby to cause it to predominate over the other in driving said registering mechanism.

11. A fluid meter having a fluid-passing opening, a closure therefor to which predetermined fluid flow imparts movement, a nozzle and turbine wheel assembly corresponding to a certain low speed range, a second nozzle and turbine wheel assembly corresponding to a higher speed range and a registering mechanism adapted to be driven by said turbine wheels, both of said nozzles connected to and receiving fluid through said closure and pivoted to vary the angular relation of each nozzle with respect to its turbine wheel to produce effective driving of said registering mechanism thereby in the corresponding speed range only.

12. A fluid meter having a fluid-passing opening, a closure therefor to which predetermined fluid flow imparts movement, a nozzle and turbine wheel assembly corresponding to a certain low speed range, a second nozzle and turbine wheel assembly corresponding to a higher speed range, a registering mechanism adapted to be driven by said turbine wheels, both of said nozzles connected to and receiving fluid through said closure, normally inoperative driving means between one of said turbine wheels and said registering mechanism, said nozzles being pivotally mounted to respond to movement of said closure to vary the angular relation of each nozzle with respect to its turbine wheel to cause the one or the other turbine wheel to predominate, and means responsive to movement of the nozzle corresponding to the low speed range for rendering said driving means effective to drive said registering mechanism in the low speed range only.

13. A fluid meter having a fluid-passing opening, a closure therefor to which predetermined fluid flow imparts movement, a nozzle and turbine wheel assembly corresponding to a certain low speed range, a second nozzle and turbine wheel assembly corresponding to a higher speed range, a registering mechanism adapted to be driven by said turbine wheels, both of said nozzles connected to and receiving fluid through said closure, a normally disengaged gear drive between one of said turbine wheels and said registering mechanism, said nozzles having a double pivotal mounting and tending to respond in two different directions to movement of said closure to vary the angular relation of each nozzle with respect to its turbine wheel to cause the one or the other turbine wheel to predominate, and a projection associated with said gear drive for contacting the nozzle corresponding to the low-speed range to effect engagement of said gear drive with said registering mechanism in the low speed range only.

14. A fluid meter having a fluid-passing opening, a closure therefor to which predetermined fluid flow imparts movement, a plurality of nozzle and turbine wheel assemblies respectively corresponding to a low-speed range and a high-speed range, said nozzles connected to said closure and receiving fluid upstream of said opening for impinging upon the corresponding turbine wheel, a pivotal mounting for said nozzles to permit response to movement of said closure to vary the angular position of the respective nozzles, guiding means for said nozzles, and a second pivotal mounting for said nozzles to permit movement along said guiding means upon movement of said closure to vary said angular position.

15. A fluid meter having a fluid-passing opening, a plug therefor of such contour as to gradually uncover said opening upon predetermined increased fluid flow, a plurality of nozzle and turbine wheel assemblies respectively corresponding to a low-speed range and a high-speed range, said nozzles connected to said plug and receiving fluid upstream of said opening for impinging upon the corresponding turbine wheel, a pivotal mounting for said nozzles to permit response in a certain direction to movement of said plug to vary the angular position of the respective nozzles, said nozzles being also pivotally mounted for movement in a different direction, and a cam plate for guiding said nozzles in said different direction to vary said angular position.

16. A fluid meter having a fluid-passing opening, a plug therefor of such contour as to gradually uncover said opening upon predetermined increased fluid flow, a plurality of nozzle and turbine wheel assemblies respectively corresponding to a low-speed range and a high-speed range, said nozzles being movably mounted to move with said plug and also in another direction and receiving fluid upstream of said opening for impinging upon the corresponding turbine wheel, and means for guiding one of said nozzles in said other direction, said plug and said guiding means jointly functioning as a calibrating element for said one nozzle in one of said speed ranges.

17. A fluid meter having a fluid-passing opening, a plug therefor of such contour as to gradually uncover said opening upon predetermined increased fluid flow, a plurality of nozzle and turbine wheel assemblies, one corresponding to a low-speed range and another to a normal speed range and an overload range, said nozzles receiving fluid upstream of said opening for impinging upon the corresponding turbine wheel, said plug and nozzles being pivotally mounted to move together, said low-speed nozzle and turbine wheel assembly operating by means of a fixed nozzle at a variable jet velocity, and said other nozzle and turbine wheel assembly operating in the normal speed range by means of a variable pitch nozzle at approximately constant jet velocity and operating in the overload range by means of a fixed nozzle at a variable jet velocity.

18. A fluid meter having an orifice, movable closure means for varying the effective size thereof, a plurality of members movable in accordance with fluid flow, means for conveying fluid from said orifice to said movable members, the first member corresponding to a low-speed range and the second to a normal speed range and an overload range, said first movable member operating from said orifice, when varied to a fixed small size by said movable closure means, in accordance with variable fluid velocities through said conveying means, and said second movable member operating in the normal speed range in accordance with the varying position of said closure means with approximately constant fluid velocity through said conveying means and operating in the overload range from said orifice, when varied to a fixed large size by said movable closure means, with variable fluid velocities through said conveying means.

19. A fluid meter having an orifice, movable plug means for gradually varying the effective size thereof, a plurality of turbine wheels, means for conveying fluid from said orifice to said turbine wheels, the first wheel corresponding to a low-speed range and the second to a normal speed range and an overload range, said first turbine wheel operating from said orifice, when varied to a fixed small size by said movable plug means, in accordance with variable jet velocities through said conveying means, and said second turbine wheel operating in the normal speed range in accordance with the varying position of said plug means with approximately constant jet velocity through said conveying means and operating in the overload range from said orifice, when varied to a fixed large size by said movable plug means, in accordance with variable jet velocities through said conveying means.

20. A fluid meter having an orifice, apertured movable plug means for gradually varying the effective size thereof from that of the aperture to that of the full orifice, a plurality of turbine wheels, means for conveying fluid from said plug means to said turbine wheels, the first wheel corresponding to a low-speed range and the second to a normal speed range and an overload range, said first turbine wheel operating from the aperture in said plug means through said conveying means in accordance with variable jet velocities, and said second turbine wheel operating in the normal speed range in accordance with the varying position of said plug means with approximately constant jet velocity through said conveying means and operating in the overload range from said full orifice in accordance with variable jet velocities through said conveying means.

21. A fluid meter having an orifice, movable closure means for varying the effective size thereof, a plurality of nozzles respectively corresponding to a low-speed range and a high-speed range, said nozzles connected to and pivotably mounted with said closure means and receiving fluid from the up-stream side of said orifice to vary in angular position in response to movements of said closure means, guiding means for one of said nozzles, and a second pivotal mounting thereof to permit movement along said guiding means upon such movements of said closure means.

22. A fluid meter having an orifice, movable closure means for varying the effective size thereof, means movable in accordance with fluid flow in either a low-speed range or a higher-speed range, fluid-ejecting means cooperating with said movable means to move the same and being movable around a pivotal point with said closure means, and guiding means cooperating with said fluid-ejecting means in only one of said speed ranges.

23. A fluid meter having an orifice, movable plug means for varying the effective size thereof, turbine wheel means movable in accordance with fluid flow in either a low-speed range or a higher-speed range, nozzle means cooperating with said turbine wheel means to drive the same and being pivotally mounted in conjunction with said plug means, and cam means cooperating with said nozzle means in said higher-speed range only.

24. A fluid meter having an orifice, movable closure means for varying the effective size thereof, means movable in accordance with fluid flow in either a low-speed range or a higher-speed range, fluid-ejecting means cooperating with said movable means to move the same and being pivotally movable with said closure means, and movable guiding means cooperating with said fluid-ejecting means and functioning jointly with said closure means as a calibrating element for said fluid-ejecting means in said higher-speed range.

WILBUR W. STEVENSON.